(12) United States Patent
Fan (10) Patent No.: US 12,515,368 B2
(45) Date of Patent: Jan. 6, 2026

(54) CHAIN SAW

(71) Applicant: JIANGSU DONGCHENG TOOLS TECHNOLOGY CO., LTD., Nantong (CN)

(72) Inventor: Gongyuan Fan, Nantong (CN)

(73) Assignee: JIANGSU DONGCHENG TOOLS TECHNOLOGY CO., LTD., Nantong (CN)

( * ) Notice: Subject to any disclaimer, the term of this patent is extended or adjusted under 35 U.S.C. 154(b) by 368 days.

(21) Appl. No.: 18/298,338

(22) Filed: Apr. 10, 2023

(65) Prior Publication Data

US 2023/0241798 A1 Aug. 3, 2023

Related U.S. Application Data

(63) Continuation of application No. PCT/CN2022/133038, filed on Nov. 19, 2022.

(30) Foreign Application Priority Data

Jan. 21, 2022 (CN) .......................... 202210073145.9

(51) Int. Cl.
*B27B 17/14* (2006.01)
*B27B 17/02* (2006.01)

(52) U.S. Cl.
CPC .............. *B27B 17/14* (2013.01); *B27B 17/02* (2013.01)

(58) Field of Classification Search
None
See application file for complete search history.

(56) References Cited

U.S. PATENT DOCUMENTS 6,877,233 B1   4/2005 Franke
9,669,563 B2 * 6/2017 Lee .......................... B27B 17/14
(Continued)

FOREIGN PATENT DOCUMENTS

CN   104209987 A   12/2014
CN   106238820 A   12/2016
(Continued)

OTHER PUBLICATIONS

Chinese Notification to Grant Patent Right for Invention, Chinese Application No. 202210073145.9, mailed Jul. 26, 2024 (5 pages).
(Continued)

*Primary Examiner* — Hwei-Siu C Payer (57) ABSTRACT

A chain saw, arranged with a guide plate and a chain. The chain saw includes a housing, a drive assembly arranged in the housing, and a fixing assembly tensioning the chain and locking the guide plate. The fixing assembly includes a shield abutting against the guide plate, a knob arranged on an outside of the shield, a tensioning member driven by the knob, a locking member snapped to the shield, and an elastic member disposed between the knob and the locking member. A side of the shield facing the locking member is arranged with a first clamping part, and a side of the locking member facing the shield is arranged with a second clamping part; in condition of the guide plate being locked, the elastic member deforms and abuts against the locking member, causing the second clamping part to snapped to the first clamping part.

17 Claims, 7 Drawing Sheets

(56) References Cited

U.S. PATENT DOCUMENTS

| | | | |
|---|---|---|---|
| 9,878,463 B2* | 1/2018 | Yu | B27B 17/14 |
| 12,145,289 B2* | 11/2024 | Lu | B27B 17/14 |
| 2019/0366580 A1 | 12/2019 | Lu | |
| 2021/0114249 A1 | 4/2021 | Li | |
| 2022/0097250 A1* | 3/2022 | Cao | B27B 17/02 |
| 2023/0241798 A1* | 8/2023 | Fan | B27B 17/14 |
| | | | 30/386 |

FOREIGN PATENT DOCUMENTS

| | | | |
|---|---|---|---|
| CN | 107414185 A | 12/2017 | |
| CN | 209633188 U | 11/2019 | |
| CN | 110560782 A | 12/2019 | |
| CN | 210615347 U | 5/2020 | |
| CN | 211362619 U | 8/2020 | |
| CN | 113523427 A | 10/2021 | |
| CN | 110560782 B | 11/2021 | |
| CN | 114425800 A | 5/2022 | |
| CN | 217494552 U | 9/2022 | |

OTHER PUBLICATIONS

Chinese First Office Action, Chinese Patent Application No. 202210073145.9, mailed Feb. 22, 2024 (11 pages).
International search report, International Application No. PCT/CN2022/133038, mailed Feb. 13, 2023 (15 pages).

* cited by examiner

CHAIN SAW

CROSS REFERENCE

The present disclosure is a continuation-application of International (PCT) Patent Application No. PCT/CN2022/133038, filed on Nov. 19, 2022, which claims priority of Chinese Patent Application No. 202210073145.9, filed on Jan. 21, 2022, the entire contents of which are hereby incorporated by reference in their entirety.

TECHNICAL FIELD

The present disclosure relates to the field of garden tools, and in particular to a chain saw.

BACKGROUND

Chain saw is a class of sawing tools driven by a motor to run the chain in order to perform cutting operations on wood, etc. The chain is installed on an outer periphery of a guide plate of the chain saw. In the process of operation, the chain will wear, and the user needs to manually replace the chain and to tension and lock the guide plate after the completion of the chain replacement. The existing chain saw includes a tensioning part and a locking part that independently arranged, while the structure is complex and occupy more space; in addition, the user has to perform two actions to complete the fixation of the guide plate, which is time-consuming and laborious.

For improvement of the existing chain saw, reference may be made to Chinese Patent No. 201810566351.7 published on Nov. 19, 2021, which discloses a chain saw including: a locking device configured to fix a guide plate and tension a chain; the locking device includes: a device housing; an operating member, configured for the user to operate to rotate the operating member around a first axis; a first locking member, configured to lock or release the guide plate; a first clutch assembly, including a first clutch member and a second clutch member; the rotation of the operating member includes a first direction and a second direction; when the first clutch assembly is in a first state, the operating member rotates in the first direction and acts on the first clutch member to lock the guide plate; when the first clutch assembly is in a second state, the operating member rotates in the second direction and acts on the first clutch member to release the guide plate; the locking device further includes a pawl, the second clutch member is arranged with a ratchet, and the pawl engages the ratchet in a unidirectional manner such that the second clutch member rotates in only one direction. The locking device integrates tensioning the chain and fixing the guide plate in one action to achieve the effect of one-key locking, which saves time and effort; however, because the structure is a one-way movement of the ratchet pawl, the pawl will reverse the movement in the process of use, and the pawl moves toward the operating member without a return structure, such that the guide plate is easily loosened and the chain is at risk of losing teeth.

In view of the above, it is necessary to provide an improved chain saw to overcome the defects of the related art.

SUMMARY OF THE DISCLOSURE

The present disclosure aims to provide a chain saw.

In a first aspect, the present disclosure provides a chain saw, arranged with a guide plate and a chain; wherein the chain saw includes a housing, a drive assembly arranged in the housing, and a fixing assembly that tensions the chain and locks the guide plate; wherein the guide plate protrudes from a front end of the housing, and the drive assembly is configured to drive the chain to carry out a cutting operation; wherein the fixing assembly includes a shield abutting against the guide plate, a knob arranged on an outside of the shield, a tensioning member driven by the knob, a locking member snapped to the shield, and an elastic member disposed between the knob and the locking member; wherein a side of the shield facing the locking member is arranged with a first clamping part, and a side of the locking member facing the shield is arranged with a second clamping part; in condition of the guide plate being locked, the elastic member deforms and abuts against the locking member, causing the second clamping part to snapped to the first clamping part.

In a second aspect, the present disclosure provides a chain saw, arranged with a guide plate and a chain; wherein the chain saw includes a housing, a drive assembly arranged in the housing, and a fixing assembly that tensions the chain and locks the guide plate; wherein the guide plate protrudes from a front end of the housing, and the drive assembly is configured to drive the chain to carry out a cutting operation; wherein the fixing assembly includes a shield abutting against the guide plate, a knob arranged on an outside of the shield, a tensioning member driven by the knob, a clutch assembly connected between the knob and the tensioning member, a locking member snapped to the shield, an elastic member disposed between the knob and the locking member, a pressure plate fixed to the knob, a bolt cap fixed to the knob, a positioning bolt fixed to the housing, a cam connected to the tensioning member, and a push block fixed to the guide plate; wherein the elastic member is disposed between the pressure plate and the locking member and abuts against the pressure plate and the locking member, and the knob is threaded to the positioning bolt through the bolt cap.

BRIEF DESCRIPTION OF THE DRAWINGS

The specific embodiments of the present disclosure are described in further detail below in conjunction with the accompanying drawings.

DETAILED DESCRIPTION

The present disclosure is described in further detail below in conjunction with the accompanying drawings and embodiments.

Figure 1:
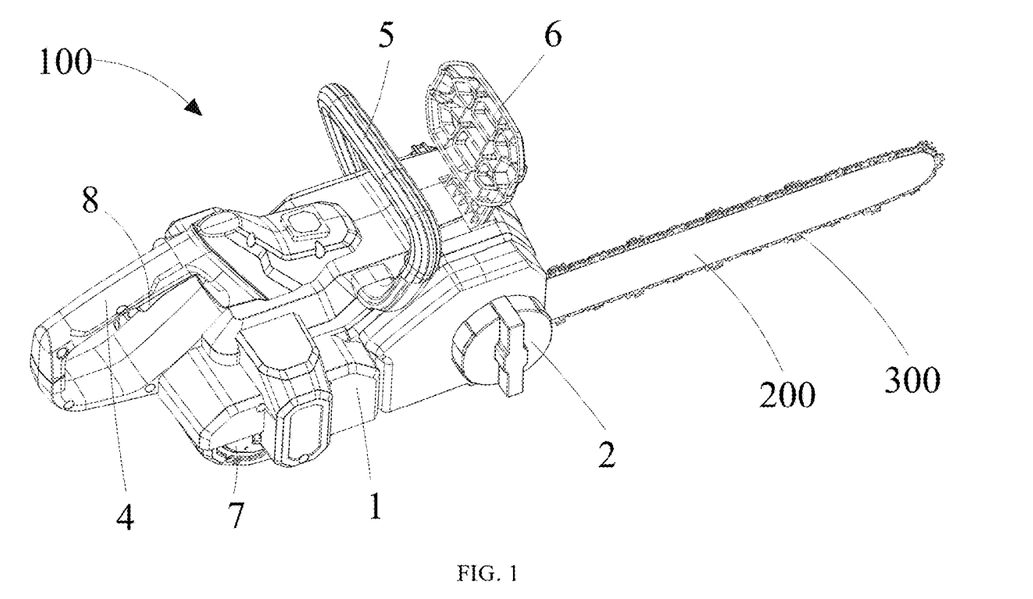
FIG. 1 is a schematic view of an entire machine of a chain saw according to an embodiment of the present disclosure.
Figure 2:
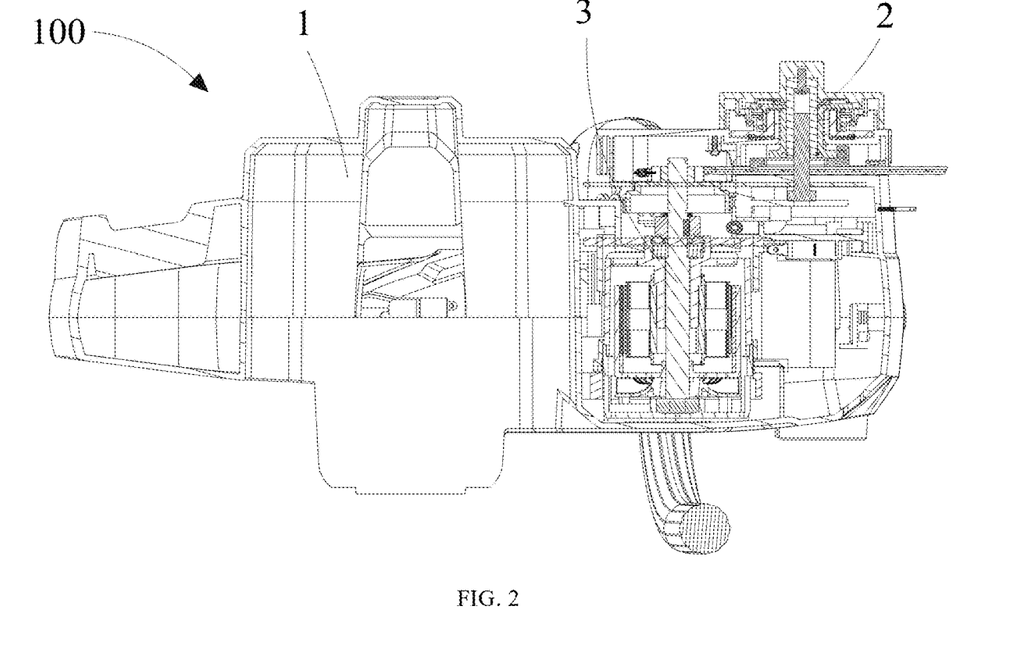
FIG. 2 is a cross-sectional schematic view of the chain saw shown in FIG. 1.
Figure 3:
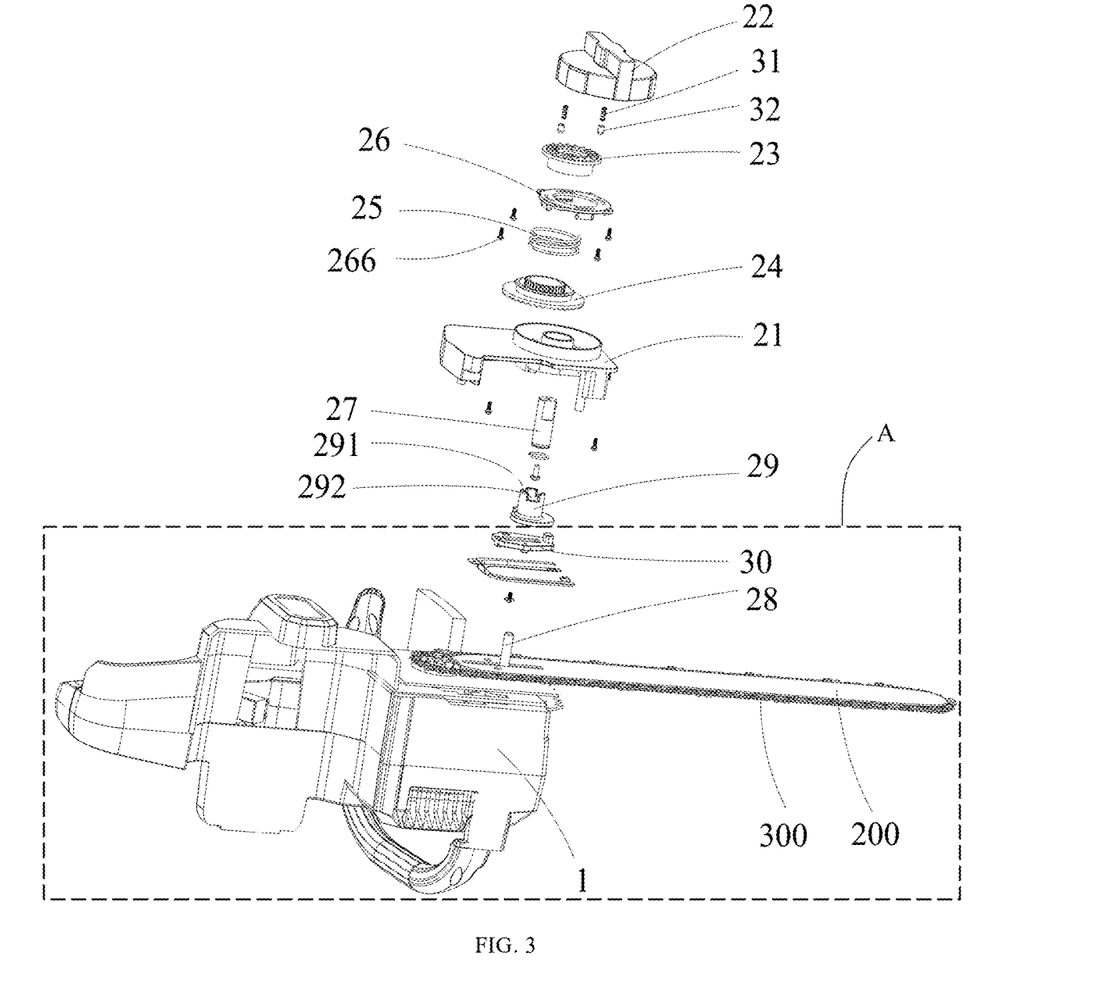
FIG. 3 is an exploded schematic view of the chain saw shown in FIG. 1.

Referring to FIGS. 1 and 2, the embodiments of the present disclosure relate to a chain saw 100 and is suitable for cutting wood, etc. The chain saw 100 is arranged with a guide plate 200 and a chain 300 disposed on an outer periphery of the guide plate 200. The chain saw 100 includes a housing 1, a drive assembly 3 arranged in the housing 1, a rear handle 4 formed at a rear end of the housing 1, a front handle 5 formed at an upper end of the housing 1, a brake assembly 6 arranged at a front end of the front handle 5, an energy assembly 7 arranged under the rear handle 4, a switch assembly 8 arranged on the rear handle 4, and a fixing assembly 2 that tensions the chain 300 and locks the guide plate 200; where the guide plate 200 protrudes from a front end of the housing 1, and the drive assembly 3 is configured to drive the chain 300 to move along the outer circumference of the guide plate 200 under an energy supply of the energy assembly 7, for carrying out cutting operations; when the user uses the chain saw 100, one hand grips the front handle 5 and the other hand grips the rear handle 4 while starting a switch plate machine to start the drive assembly 3; when the chain saw 100 recoils, the hand that grips the front handle 5 can trigger the brake assembly 6 to emergency brake the drive assembly 3, thereby effectively avoiding the injury caused by the recoil to the user. The operating principle of the chainsaw is as follows: Referring to FIG. 2, the drive assembly 3 includes a motor. The motor features a motor shaft. As shown in FIG. 3 also FIG. 12, a sprocket is arranged on the motor shaft, such that the chain is directly driven through the sprocket.

In the embodiments, the energy assembly 7 may be a battery pack; in some embodiments, the energy assembly 7 is a 58V high-capacity battery pack to enhance the range and performance of the chain saw 100; in addition, the battery pack may be removably arranged to the chain saw 100 to facilitate charging of the battery pack; the user may also carry multiple battery packs to meet the needs of long working occasions.

Figure 4:
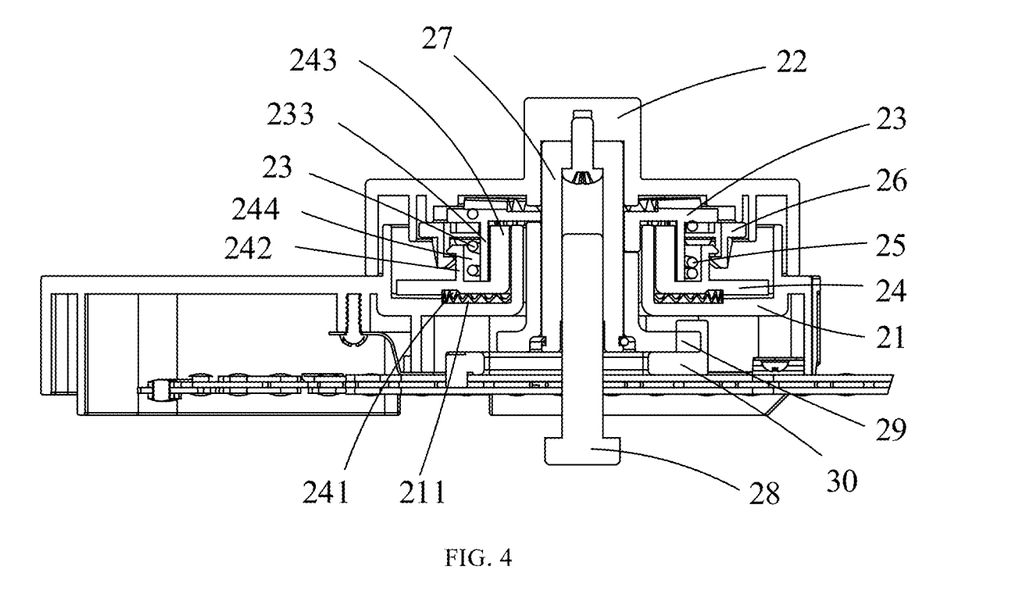
FIG. 4 is a cross-sectional schematic view of a fixing assembly shown in FIG. 1.
Figure 5:
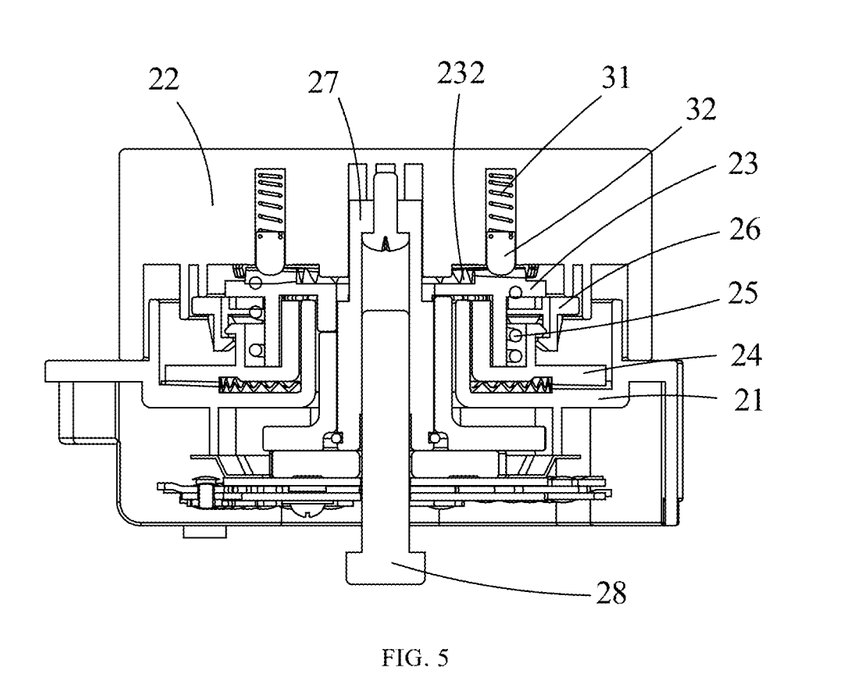
FIG. 5 is a cross-sectional schematic view of another angle of the fixing assembly shown in FIG. 4.
Figure 6:
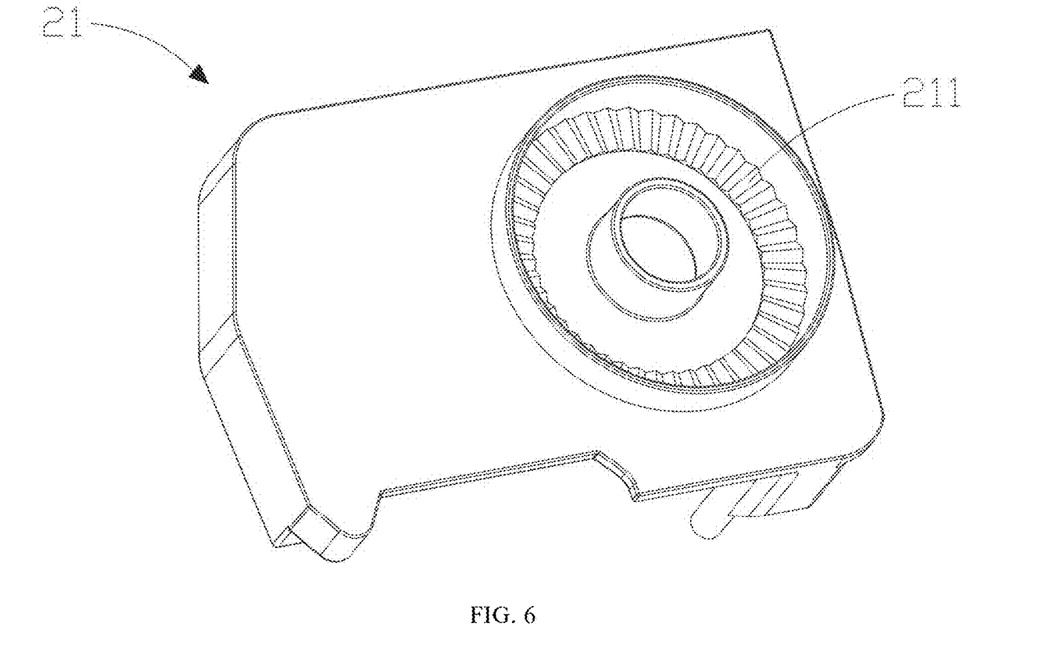
FIG. 6 is a structural schematic view of a shield in the chain saw shown in FIG. 1.

Referring to FIGS. 3 to 5, the fixing assembly 2 includes a shield 21 abutting against the guide plate 200, a knob 22 arranged on an outside of the shield 21, a tensioning member 23 driven by the knob 22, a clutch assembly connected between the knob 22 and the tensioning member 23, a locking member 24 snapped onto the shield 21, an elastic member 25 disposed between the knob 22 and the locking member 24, a pressure plate 26 fixed to the knob 22, a bolt cap 27 fixed to the knob 22, a positioning bolt 28 fixed to the housing 1, a cam 29 connected to the tensioning member 23, and a push block 30 fixed to the guide plate 200; where the elastic member 25 is disposed between the pressure plate 26 and the locking member 24 and abuts against the pressure plate 26 and the locking member 24, and the knob 22 is threaded to the positioning bolt 28 through the bolt cap 27; the knob 22 can be turned to gradually approach or move away from the guide plate 200.

In the embodiments, the tensioning member 23, clutch assembly, cam 29, and push block 30 together constitute a tensioning module of the chain saw 100; while the locking member 24 and elastic member 25 together constitute a locking module of the chain saw 100. Since the tensioning action and locking action of the chain saw 100 are carried out by manipulating the knob 22, the effect of tensioning and locking with one key may be achieved, which saves time and effort. In addition, the fixing assembly 2 occupies a smaller volume, which is conducive to the miniaturization of the chain saw 100.

Figure 8:
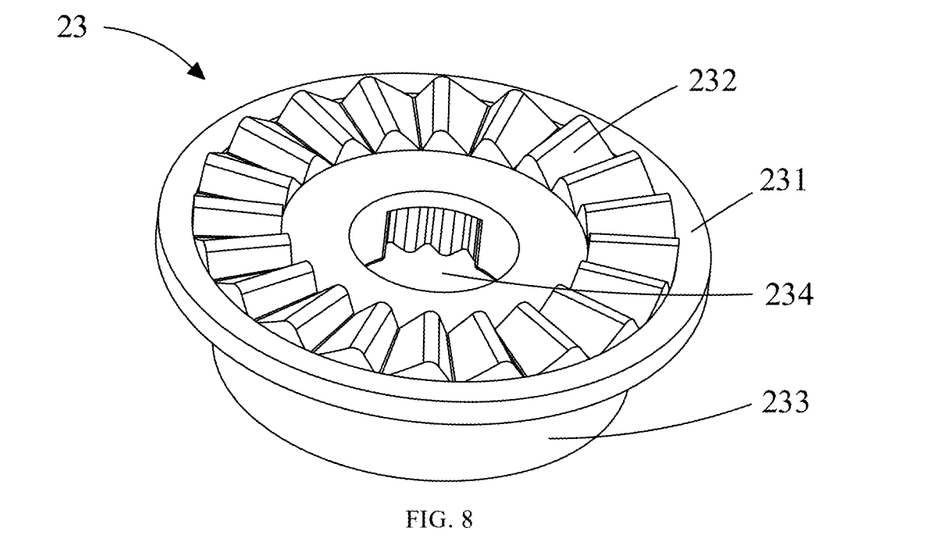
FIG. 8 is a structural schematic view of a tensioning member in the chain saw shown in FIG. 1.
Figure 9:
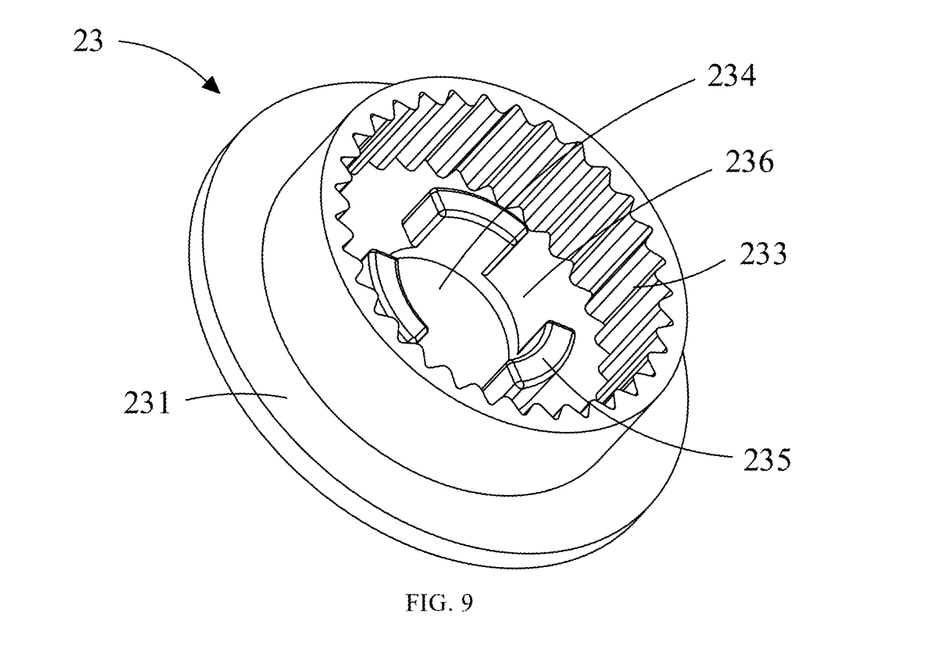
FIG. 9 is a structural schematic view of another angle of the tensioning member shown in FIG. 8.

Further referring to FIG. 8 and FIG. 9, the tensioning member 23 includes a disc-shaped body 231, a first connection part 233 protruding from an end face of the body 231 towards the locking member 24, a third tooth 232 arranged on another end face of the body 231, a third connection part 235 penetrating a first hole 234 of the body 231 and arranged in the first connection part 233; where the first connection part 233 is connected to the locking member 24, and the third connection part 235 is connected to the cam 29; during the movement of the tensioning member 23, the locking member 24 and the cam 29 are driven to move at the same time.

In the embodiments, the number of the third connection parts 235 is multiple, the third connection parts 235 are distributed at intervals along an outer periphery of the first hole 234, and a first gap 236 is defined between each two adjacent third connection parts 235; the cam 29 includes fourth connection parts 291 matching the third connection parts 235, the number of the fourth connection parts 291 is the same as the number of the third connection parts 235, and the fourth connection parts 291 are also distributed at intervals such that a second gap 292 is defined between each two adjacent fourth connection parts 291; each third connection part 235 is inserted into a corresponding second gap 292, and each fourth connection part 291 is inserted into a corresponding first gap 236 to transmit the force of the tensioning member 23 to the cam 29.

In the embodiments, the rotation of the cam 29 drives the push block 30 to move forward, and the push block 30 and the guide plate 200 are fixed together, such that the guide plate 200 also moves forward, thereby tensioning the chain 300.

Figure 12:
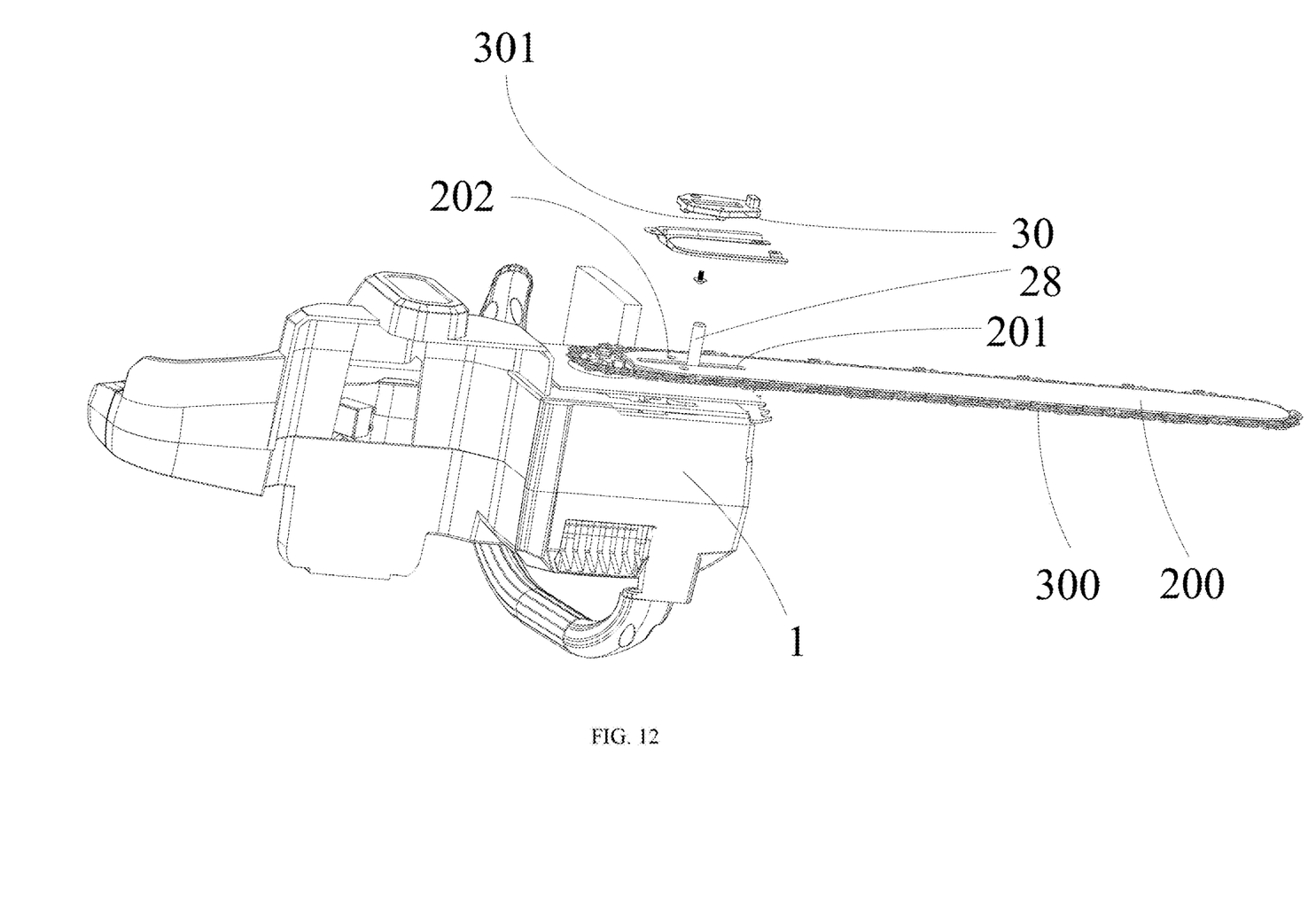
FIG. 12 is an enlarged view of area A circumscribed in FIG. 3.

Specifically, referring to FIG. 12, the guide plate 200 includes a groove 201 running along a front-rear direction and recesses 202 on both sides of the groove 201, and the push block 30 includes a protrusion 301 extending toward the guide plate 200; the positioning bolt 28 extends through the groove 201 and is connected to the bolt cap 27, and the protrusion 301 of the push block 30 is arranged in the recesses 202 of the guide plate 200 to make the push block 30 and the guide plate 200 fixed together.

Referring to FIGS. 3, 5 and 8, the clutch assembly includes a spring 31 and a clutch block 32 received in the knob 22, with an end of the spring 31 abutting against the knob 22 and the other end abutting against the clutch block 32; the clutch block 32 includes a post and a spherical body, the post abutting against the spring 31, and the spherical body abutting against the third tooth 232 of the tensioning member 23.

In the embodiments, due to the presence of the clutch assembly, the fixing assembly 2 has a first state of transmitting power and a second state of not transmitting power. In the first state, turning the knob 22 drives the rotation of the tensioning member 23 through the clutch assembly, and the rotation of the tensioning member 23 drives the rotation of the cam 29, which then drives the push block 30 and the guide plate 200 to move forward, thereby tensioning the chain 300; in the second state, turning the knob 22 does not cause the tensioning member 23 to rotate since the clutch assembly does not transmit force, and in the second state, continuing to turn the knob 22 will carry out the locking operation.

Figure 7:
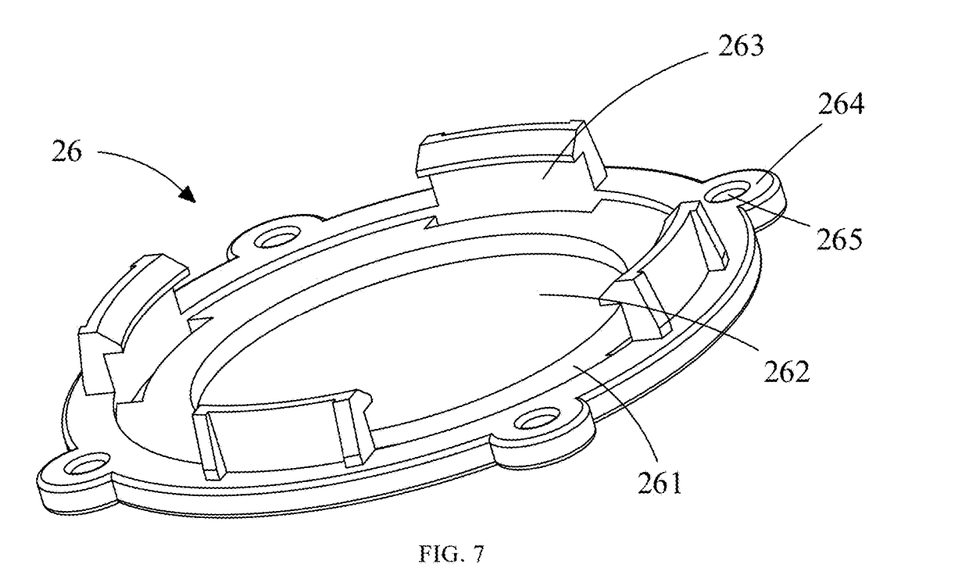
FIG. 7 is a structural schematic view of a pressure plate in the chain saw shown in FIG. 1.

Referring to FIG. 3 and FIG. 7, the pressure plate 26 includes a substrate 261, a channel 262 through the substrate 261, a first jaw 263 protruding from the substrate 261 toward the locking member 24, a mounting part 264 protruding outward from an outer edge of the substrate 261, and a mounting hole 265 through the mounting part 264. The first jaw 263 is connected to the locking member 24; a screw 266 passes through the mounting hole 265 and is connected to the knob 22 to fix the pressure plate 26 to the knob 22.

In the embodiments, the tensioning member 23 is disposed between the knob 22 and the pressure plate 26; furthermore, the tensioning member 23 is disposed in a space enclosed by the knob 22 and the pressure plate 26.

In the embodiments, the number of the first jaws 263 and the number of the mounting parts 264 are each multiple and the same; the first jaws 263 and the mounting parts 264 are spaced sequentially in an alternate manner along an outer circumference of the channel 262.

Figure 10:
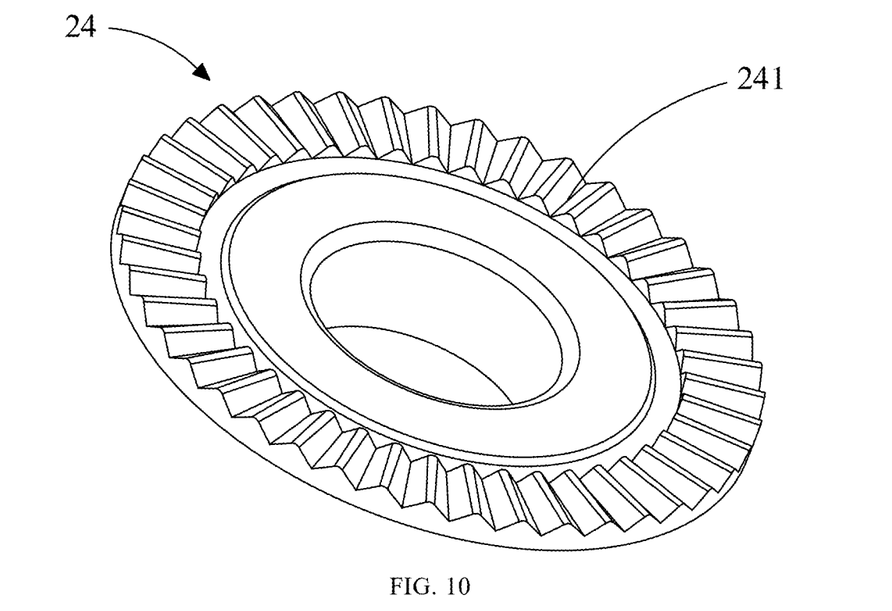
FIG. 10 is a structural schematic view of a locking member in the chain saw shown in FIG. 1.
Figure 11:
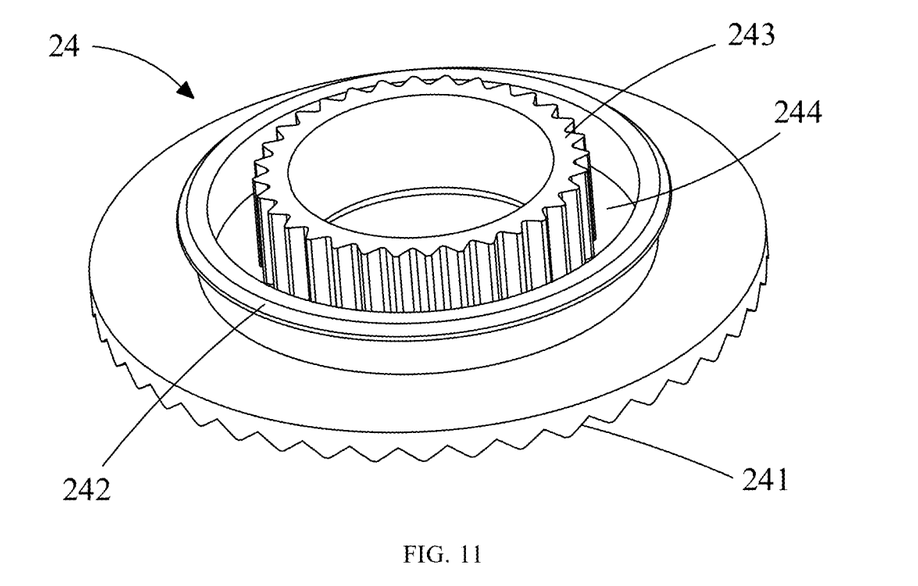
FIG. 11 is a structural schematic view of another angle of the locking member shown in FIG. 10.

Referring to FIG. 4, FIG. 10, and FIG. 11, the locking member 24 includes a second clamping part 241 arranged on a side of the locking member 24 toward the shield 21, a second jaw 242 protruding from a back side of the second clamping part 241 toward the pressure plate 26, a second connection part 243 protruding from the back side of the second clamping part 241 toward the tensioning member 23. Specifically, the second clamping part 241 is a second tooth, the second connection part 243 is arranged on an inner side of the second jaw 242, and the second connection part 243 and the second jaw 242 are spaced apart to form a holding part 244; the first connection part 233 of the tensioning member 23 passes through the channel 262 and extends into the holding part 244 to be connected to the second connection part 243.

In the embodiments, the first connection part 233 and the second connection part 243 are coupled by splines. In the first state, the knob 22 is turned to tension the chain 300, the knob 22 moves along the positioning bolt 28 toward the guide plate 200 through the bolt cap 27, the clutch assembly transfers the force of the knob 22 to the tensioning member 23, the rotation of the tensioning member 23 drives the locking member 24 to rotate, and the locking member 24 maintains cooperating with the shield 21 under the action of the elastic member 25. After the tensioning operation is completed, the second state is entered, the knob 22 is continued to be turned to lock the guide plate 200; at this time, the clutch assembly does not transfer force, the tensioning member 23 does not rotate, and the knob 22 still moves along the positioning bolt 28 toward the guide plate 200 through the bolt cap 27; in this process, the compression of the elastic member 25 increases, deformation occurs, and the elastic force also increases, such that the elastic member 25 continues to press against the locking member 24, and the locking member 24 and the shield 21 are fit more closely; when the locking operation is completed, the elastic member 25 has the maximum force, making it difficult to produce relative movement between the locking member 24 and the shield 21, and the shield 21 is firmly pressed on the guide plate 200, such that the guide plate 200 is not easy to loosen.

In the embodiments, the elastic member 25 is a compression spring.

As shown in FIGS. 3 to 6, a side of the shield 21 facing the locking member 24 is arranged with a first clamping part 211, and the second clamping part 241 is clamped to the first clamping part 211. Specifically, the first clamping part 211 is a first tooth, and the first tooth 211 engages the second tooth 241. The elastic member 25 is disposed between the first connection part 233 and the second jaw 242, an end of the elastic member 25 is connected to the substrate 261 of the pressure plate 26, and the other end is received in and connected to the holding part 244 of the locking member 24. Under the action of the elastic member 25, the second tooth 241 is always clamped to the first tooth 211, such that the locking member 24 keeps being attached to the shield 21.

In the embodiments, the number of the first teeth 211 and the number of the second teeth 241 are each greater than or equal to 40, such that when the second teeth 241 deflect due to vibration, the second teeth 241 remain engaged with the first teeth 211 after rotating at a certain angle because the shield 21 remains immobile and the elastic member 25 always presses against the locking member 24. In this way, the locking member 24 always remains engaged with the shield 21 to ensure that the locking function does not fail.

Further, the number of the first teeth 211 and the number of the second teeth 241 are each 43. The locking member 24 is disposed between the shield 21 and the knob 22, and the locking member 24 is received in the inner side of the knob 22. To achieve the miniaturization of the chain saw 100, the volume of the knob 22 cannot be too large, such that the volume of the locking member 24 cannot be too large. In addition, the engagement stability of the first tooth 211 and the second tooth 241 shall be ensured. Therefore, preferably the number of the first teeth 211 and the number of the second teeth 241 are each 43.

Referring to FIG. 5 and FIG. 11, the second jaw 242 is an annular configuration around an outer periphery of the second connection part 243, with the first jaw 263 of the pressure plate 26 abutting against the second jaw 242 of the locking member 24. When the knob 22 is reversed and the unlocking operation is performed, the bolt cap 27 moves along the positioning bolt 28 in a direction away from the guide plate 200, the elastic member 25 is gradually released, and the pressure plate 26 drives the locking member 24 to move away from the guide plate 200 through the first jaw 263, such that the second tooth 241 of the locking member 24 is gradually removed from a tooth fit area of the first tooth 211 of the shield 21, and the resistance of the knob 22 becomes less, and the user's operation will become more comfortable.

In the present disclosure, the tensioning action and locking action of the chain saw 100 are carried out by manipulating the knob 22 to achieve the effect of one-key tensioning or locking, which saves time and effort; in addition, the whole fixing assembly 2 occupies a small volume, which is conducive to the miniaturization of the chain saw 100; by arranging the first clamping part 211 on the shield 21 and arranging the second clamping part 241 on the locking member 24, the two clamping parts are clamped together, and it is difficult to produce relative movement between the locking member 24 and the shield 21 under the action of the elastic member 25; therefore, the shield 21 will be firmly pressed on the guide plate 200, making it difficult for the guide plate 200 to loosen. In addition, the first jaw 263 is arranged on the pressure plate 26 and the second jaw 242 is arranged on the locking member 24, and the first jaw 263 abuts against the second jaw 242, such that when the knob 22 is reversed to unlock, the pressure plate 26 drives the locking member 24 to move away from the guide plate 200 through the first jaw 263; in this way, the second tooth 241 of the locking member 24 is gradually removed from a tooth fit area of the first tooth 211 of the shield 21, the resistance of the knob 22 becomes less, and the user's operation will become more comfortable.

The present disclosure is not limited to the above specific implementation. Those skilled in the art can easily understand that there are many other alternatives to the chain saw of the present disclosure without departing from the principles and scope of the present disclosure. The scope of the present disclosure is subject to the content of the claims.

What is claimed is:

1. A chain saw, arranged with a guide plate and a chain; wherein the chain saw comprises a housing and a fixing assembly that tensions the chain and locks the guide plate; wherein the guide plate protrudes from a front end of the housing, and the chain is capable of carrying out a cutting operation;
    wherein the fixing assembly comprises a shield abutting against the guide plate, a knob arranged on an outside of the shield, a tensioning member driven by the knob, a locking member snapped to the shield, and an elastic member disposed between the knob and the locking member; wherein a side of the shield facing the locking member is arranged with a first clamping part, and a side of the locking member facing the shield is arranged with a second clamping part; in condition of the guide plate being locked, the elastic member deforms and abuts against the locking member, causing the second clamping part to snap to the first clamping part;
    wherein the fixing assembly further comprises a pressure plate fixed to the knob; the tensioning member is disposed between the knob and the pressure plate; the elastic member is disposed between the pressure plate and the locking member and abuts against the pressure plate and the locking member;
    the pressure plate comprises a substrate and a first jaw protruding from the substrate toward the locking member; the locking member comprises a second jaw protruding from a back side of the second clamping part toward the pressure plate; the first jaw abuts against the second jaw.

2. The chain saw according to claim 1, wherein the first clamping part is a first tooth, and the second clamping part is a second tooth; the first tooth engages the second tooth.

3. The chain saw according to claim 2, wherein the first tooth comprises a plurality of first teeth, and the second tooth comprises a plurality of second teeth, each of the number of the plurality of first teeth and the number of the plurality of second teeth being greater than or equal to 40.

4. The chain saw according to claim 1, wherein the pressure plate further comprises a mounting part protruding outward from an outer edge of the substrate and a mounting hole running through the mounting part; a screw passes through the mounting hole and is connected to the knob to fix the pressure plate to the knob.

5. The chain saw according to claim 4, wherein the pressure plate further comprises a channel through the substrate; the first jaw comprises a plurality of first jaws and the mounting part comprises a plurality of mounting parts; the plurality of first jaws and the plurality of mounting parts are spaced sequentially in an alternate manner along an outer circumference of the channel.

6. The chain saw according to claim 1, wherein the tensioning member comprises a body and a first connection part protruding from the body towards the locking member; the locking member further comprises a second connection part protruding from the back side of the second clamping part toward the tensioning member; the first connection part and the second connection part are coupled by splines.

7. The chain saw according to claim 6, wherein the tensioning member further comprises a tooth arranged on an end face of the body opposite to the first connection part, and a third connection part penetrating a first hole of the body and arranged in the first connection part.

8. The chain saw according to claim 6, wherein the second connection part is arranged on an inner side of the second jaw, and the second connection part and the second jaw are spaced apart to form a holding part; the first connection part extends into the holding part.

9. The chain saw according to claim 8, wherein the elastic member is disposed between the first connection part and the second jaw; one end of the elastic member abuts against the substrate, and the other end of the elastic member is received in the holding part.

10. The chain saw according to claim 1, wherein the fixing assembly further comprises a clutch assembly connected between the knob and the tensioning member, a cam connected to the tensioning member, and a push block fixed to the guide plate; wherein the cam is configured to drive the push block to move forward to tension the guide plate.

11. The chain saw according to claim 10, wherein the clutch assembly comprises a spring and a clutch block received in the knob, with one end of the spring abutting against the knob and the other end of the spring abutting against the clutch block.

12. A chain saw, arranged with a guide plate and a chain; wherein the chain saw comprises a housing and a fixing assembly that tensions the chain and locks the guide plate; wherein the guide plate protrudes from a front end of the housing, and the chain is capable of carrying out a cutting operation;
    wherein the fixing assembly comprises a shield abutting against the guide plate, a knob arranged on an outside of the shield, a tensioning member driven by the knob, a clutch assembly connected between the knob and the tensioning member, a locking member snapped to the shield, an elastic member disposed between the knob and the locking member, a pressure plate fixed to the knob, a bolt cap fixed to the knob, a positioning bolt fixed to the housing, a cam connected to the tensioning member, and a push block fixed to the guide plate; wherein the elastic member is disposed between the pressure plate and the locking member and abuts against the pressure plate and the locking member, and the knob is threaded to the positioning bolt through the bolt cap;
    wherein the tensioning member comprises a body, a first connection part protruding from an end face of the body towards the locking member, a tooth arranged on another end face of the body, and a second connection part penetrating a first hole of the body and arranged in the first connection part; wherein the first connection part is connected to the locking member, and the second connection part is connected to the cam; during a movement of the tensioning member, the locking member and the cam are driven to move at the same time.

13. The chain saw according to claim 12, wherein the second connection part comprises a plurality of second connection parts, the plurality of second connection parts are distributed at intervals along an outer periphery of the first hole, and a first gap is defined between each two adjacent second connection parts.

14. The chain saw according to claim 13, wherein the cam comprises a plurality of third connection parts matching the plurality of third connection parts, the number of the plurality of third connection parts is the same as the number of the plurality of third connection parts, and the plurality of third connection parts are distributed at intervals such that a second gap is defined between each two adjacent third connection parts;

each of the plurality of third connection parts is inserted into a corresponding second gap, and each of the plurality of third connection parts is inserted into a corresponding first gap.

15. The chain saw according to claim 12, wherein the clutch assembly comprises a spring and a clutch block received in the knob, with one end of the spring abutting against the knob and the other end of the spring abutting against the clutch block; the clutch block comprises a post and a spherical body, the post abutting against the spring, and the spherical body abutting against the tooth.

16. The chain saw according to claim 12, wherein the guide plate comprises a groove running along a front-rear direction and recesses on both sides of the groove, and the push block comprises a protrusion extending toward the guide plate; the positioning bolt extends through the groove and is connected to the bolt cap, and the protrusion is arranged in the recesses of the guide plate to make the push block and the guide plate fixed together.

17. A chain saw, arranged with a guide plate and a chain; wherein the chain saw comprises a housing and a fixing assembly that tensions the chain and locks the guide plate; wherein the guide plate protrudes from a front end of the housing, and the chain is capable of carrying out a cutting operation;

wherein the fixing assembly comprises a shield abutting against the guide plate, a knob arranged on an outside of the shield, a tensioning member driven by the knob, a locking member snapped to the shield, and an elastic member disposed between the knob and the locking member; wherein a side of the shield facing the locking member is arranged with a first clamping part, and a side of the locking member facing the shield is arranged with a second clamping part; in condition of the guide plate being locked, the elastic member deforms and abuts against the locking member, causing the second clamping part to snap to the first clamping part;

wherein the first clamping part is first teeth, and the second clamping part is second teeth;

in condition of the second clamping part snapping to the first clamping part, each of the first teeth extends along a corresponding radial direction perpendicular to a compression direction of the elastic member, and each of the second teeth extends along a corresponding radial direction perpendicular to the compression direction of the elastic member; the first teeth and the second teeth are snapped together in a direction parallel to the compression direction of the elastic member.

\* \* \* \* \*